M. ROMANOWICZ.
PACKING FOR PHOTOGRAPHIC PLATES OR FLAT FILMS.
APPLICATION FILED MAR. 6, 1908.

951,027.

Patented Mar. 1, 1910.

WITNESSES:
Edw. D. Spring.
W. P. Burke.

INVENTOR.
Marian Romanowicz,
BY
Wm. S. Mellan
ATT'Y.

UNITED STATES PATENT OFFICE.

MARIAN ROMANOWICZ, OF VIENNA, AUSTRIA-HUNGARY.

PACKING FOR PHOTOGRAPHIC PLATES OR FLAT FILMS.

951,027. Specification of Letters Patent. Patented Mar. 1, 1910.

Application filed March 6, 1908. Serial No. 419,439.

*To all whom it may concern:*

Be it known that I, MARIAN ROMANOWICZ, a subject of the Emperor of Austria-Hungary, and residing at Vienna, III. Rechte Bahngasse 14, in the Empire of Austria-Hungary, have invented new and useful Improvements in a Packing for Photographic Plates or Flat Films, of which the following is a specification.

This invention relates to a packing for photographic plates or flat films provided with a simple device which renders it possible to change the plates or films in daylight.

The invention may be briefly characterized as the provision of a sliding cover for the package, which on the use of the apparatus is drawn out of the adapter and in which cover the plate or film change takes place. After the operation the cover is again pushed over the package.

Figure 1:
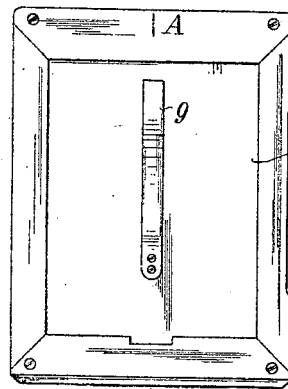
Figures 3, 7:
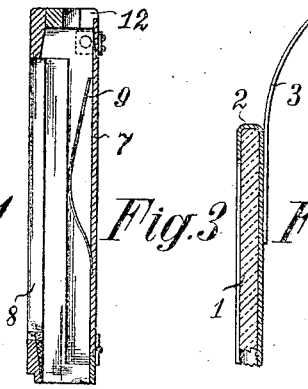
Figure 2:
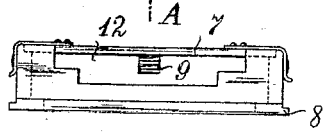
Figure 6:
Figure 4:
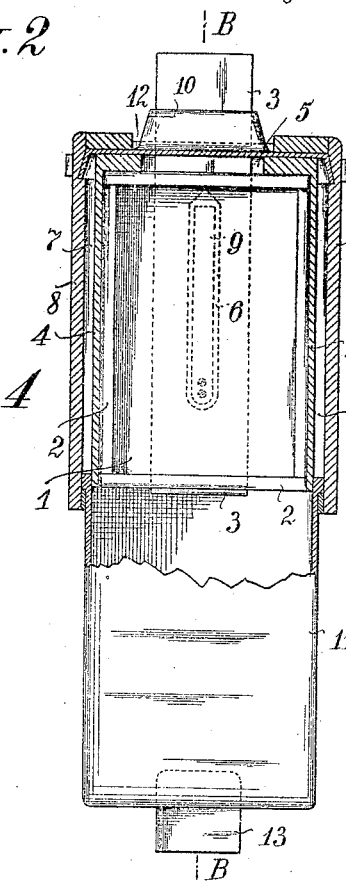
Figure 5:
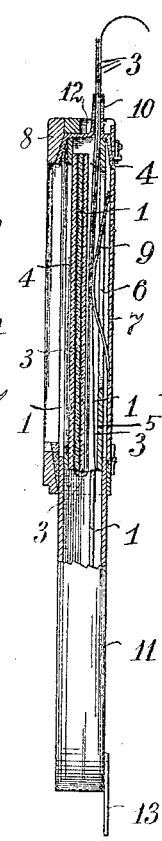

In the accompanying drawing are illustrated two constructions of the invention as follows:

Figure 1 shows a front view of the adapter. Fig. 2 shows a view from above thereof, and Fig. 3 a section on the lines A—A of Fig. 1. Fig. 4 shows the adapter with inserted packing in section. Fig. 5 shows a section on the lines B—B of Fig. 4 with the plate interchange partly completed. Fig. 6 shows the mode of support of the plates in the package by means of a section through the plates. Fig. 7 is a detail.

The plates or flat films 1 are covered on their rear side in the well known manner with a paper or metal sheet 2, which projects in front over the edge of the plate, in order that on the superposition of the plates and during the displacement thereof any damage of the sensitized layer may be prevented. On the rear side of the plates there are attached to this cover lugs 3 preferably of paper and fastened by gumming or the like (Figs. 6 and 7). For the packing of the plates, the lugs as shown in Fig. 6, are so arranged that they lie along the back of the plate, and all the lugs are laid around the back of the last plate 1, which possesses no lugs. The plates thus arranged are inserted in the packing proper. This consists of a frame 4 which is open at its front side and is closed at its rear side by a partition 5, which possesses a slot 6, through which a spring 9 engages said spring being fixed to the back 7 of the adapter 8. Above, the frame possesses a slot 10, through which project the lugs 3. Above this frame there may be inserted a lid 11. When this lid is in place, then the plates are kept in the frame light-tight. The adapter has on one side an opening 12 for the passage of the lugs 3, and the other side is quite open, so that the lid 11 can be drawn down. When in use, the package is so placed in the adapter that the sensitized layers come to lie in front and the lugs 3 thereof project through the opening 12, while a lug 13 attached to the cover 11 projects through the open side thereof.

The cover 11 is drawn from the frame by means of the lugs 13 as shown in Figs. 4 and 5 through the open narrow side of the adapter. Hereupon the sensitized layer of the front plate is exposed to the objective and the spring 9 acts directly upon the plate and brings it into the right position. When the picture has been taken, then the plate change is effected by pulling at the rearmost lug 3. Hereby the foremost plate is caused to move (in the direction indicated by the arrow Fig. 5) downward along the lid 11 until it has assumed the position indicated at 1', whereupon it on further drawing places itself behind the last plate. The plate interchange is thus completed and the lug 3 of this plate can be torn off.

Having now particularly described and ascertained the nature of my said invention and in what manner the same is to be performed, I declare that what I claim is:

1. A device for holding photographic plates comprising a package containing a set of plates, tabs secured to all of said plates excepting the last for transferring the plates after exposure, from the front to the rear of the package, said package being of a depth to only accommodate the whole set of plates and said tabs being passed around the rearmost plate which has no tab, substantially as described.

2. A packing for photographic plates comprising a frame having a spring on one wall, a second frame adapted to hold the plates and being situated in the first frame, said second frame having a back wall having a slot therein adapted to engage with the spring on the first frame, and a lid sliding through one end of the first frame and means for transferring the plates from the second frame to the lid and from the lid back to the second frame.

3. A packing for photographic plates comprising a frame, having an opening in its front, and an opening in its bottom, and a third opening in its top, a box-like lid having its top open and slidably mounted in said frame, said box passing through the open bottom of said frame, a spring on the back of said frame, a second frame adapted to be filled with plates and having its front open and a slot in its rear side into which projects the spring of the first frame, tabs secured to all but the last plate, each tab being secured to the top of a plate and extending downwardly back of said plate, and upwardly in rear of all the plates and through the opening in the top of the first frame whereby when the lid is lowered the plate can be transferred from the second frame to the lid and from the lid to the rear of the second frame.

In testimony whereof I have signed my name to this specification in the presence of two subscribing witnesses.

MARIAN ROMANOWICZ.

Witnesses:
    ING. G. WOLF,
    ROBERT W. HEINGARTNER.